US005252009A

United States Patent [19]

Bossler

[11] Patent Number: 5,252,009
[45] Date of Patent: Oct. 12, 1993

[54] INDUSTRIAL AND ROADWAY IDENTIFICATION AND FLOOR SURFACE TREATMENT SYSTEM, AND DIAMOND SURFACE DRILL BIT FOR USE IN INSTALLING THE SYSTEM

[76] Inventor: Joseph Bossler, 78-625 Vista Del Sol, Indian Wells, Calif. 92210

[21] Appl. No.: 940,338

[22] Filed: Sep. 3, 1992

Related U.S. Application Data

[62] Division of Ser. No. 644,901, Jan. 22, 1991, Pat. No. 5,158,393.

[51] Int. Cl.$^5$ .......... B23B 51/00

[52] U.S. Cl. .......... 408/145; 175/386; 408/202; 408/201; 408/227

[58] Field of Search .......... 408/145, 199, 227, 201, 408/202, 209; 175/327, 386, 387, 404

[56] References Cited

U.S. PATENT DOCUMENTS

| | | | |
|---|---|---|---|
| 1,809,351 | 6/1931 | Oliver | 175/387 X |
| 2,196,601 | 4/1940 | Behr | 404/12 |
| 2,760,757 | 8/1956 | Donaldson | 404/9 X |
| 2,945,403 | 7/1960 | Egger | 408/202 |
| 2,978,846 | 4/1961 | Barron . | |
| 3,095,053 | 6/1963 | Pistole et al. | 175/327 |
| 3,468,583 | 9/1969 | Austin . | |
| 3,605,575 | 9/1971 | Stevanon . | |
| 3,605,579 | 12/1968 | Heltzel . | |
| 3,736,995 | 6/1973 | Salter . | |
| 3,833,073 | 9/1974 | Carver . | |
| 3,915,582 | 10/1975 | Clarke | 404/75 |
| 4,136,990 | 1/1979 | Morgan | 404/9 |
| 4,176,723 | 12/1979 | Arceneaux . | |
| 4,185,132 | 1/1980 | Gurney | 404/12 X |
| 4,350,215 | 9/1982 | Radtke . | |
| 4,352,610 | 10/1982 | Yankovoy et al. | 408/209 X |
| 4,458,949 | 7/1984 | Jury . | |
| 4,551,045 | 11/1985 | Bossler . | |
| 4,657,445 | 4/1987 | Bossler . | |
| 4,668,548 | 5/1987 | Lankard | 404/75 X |
| 4,737,049 | 4/1988 | Callhan | 404/11 X |
| 4,776,411 | 10/1988 | Jones . | |
| 4,797,025 | 1/1989 | Kennedy . | |
| 4,858,706 | 8/1989 | Lebourg . | |
| 4,911,254 | 3/1990 | Keith . | |
| 4,913,247 | 4/1990 | Jones . | |
| 4,955,982 | 9/1990 | Paulos | 404/11 |
| 4,990,024 | 2/1991 | Eigenmann | 404/12 |

*Primary Examiner*—Steven C. Bishop
*Attorney, Agent, or Firm*—Carter & Schnedler

[57] ABSTRACT

Disclosed are methods for applying durable markings to wearing surfaces, such as concrete factory floors, roadways, terrazzo or ceramic tile floors, or for imparting particular floor surface qualities, such as providing a non-skid surface. A diamond surface drill bit rotating at, for example, 2500 to 5000 rpm is employed to form dry recesses in the surface, which recess is immediately receptive to adhesive for attaching a premolded insert, or to an insert formed in situ, such as an insert of an acrylic polymer. The disclosed surface drill bit has a cutting end with two general types of diamond-impregnated cutting element segments attached. Attached around the periphery of the cutting end are peripheral gauge cutting element segments of arcuate configuration spaced from each other. Also attached to the cutting end are a plurality of inside cutting elements arranged in a generally radially extending pattern, starting from within the spaces between the peripheral gauge cutting element segments, and extending radially inwardly. The inside cutting element segments serve the dual purposes of cutting away areas of the surface within the peripheral extent, and serving as air vanes to promote airflow for cooling and carrying away debris. To maintain the lateral position of the drill bit during operation, either a small core drill centered in the cutting end or a pin engaging a pre-drilled hole in the masonry surface is provided. The drill bit may be assembled in various ways to suit a variety of specific on-site conditions.

9 Claims, 4 Drawing Sheets

INDUSTRIAL AND ROADWAY IDENTIFICATION AND FLOOR SURFACE TREATMENT SYSTEM, AND DIAMOND SURFACE DRILL BIT FOR USE IN INSTALLING THE SYSTEM

This is a division of U.S. patent application Ser. No. 07/644,901, filed Jan. 22, 1991, now U.S. Pat. No. 5,158,393.

BACKGROUND OF THE INVENTION

The present invention relates to floor and road surface identification systems for industrial and roadway use, as well as floor surface treatment in general, and to a specialized diamond surface drill bit for use in installing the systems. More particularly, the invention relates to a rotary surface drill bit for forming a dry recess in a wearing surface such as concrete, asphalt-concrete, masonry (including block and brick), tile, terrazzo or stone, and to methods employing the rotary surface drill bit for applying durable markings to such wearing surfaces, or for providing a sanitary, non-skid floor surface.

In many factory and industrial environments, it is desired to put markings on the floor to designate certain areas, for example hard-hat areas, traffic lanes for fork-lift trucks, and the like. Conventionally, paint is used, which tends to wear out over time. Such floor surfaces are generally concrete.

Another environment where durable markings are desired on a wearing surface, such as concrete or asphalt-concrete, is ordinary road markings, that is, lines painted on pavement to designate traffic lanes and the like. Although relatively durable paint is used, the paint nevertheless eventually wears, and the lines must be repainted.

Another common practice for applying road markings is to employ traffic tape strip material. Traffic tape strip is polymer based, and has embedded glass beads to impart reflecting characteristics. For attachment to a road surface, there is adhesive on the underside of the tape strip. While the adhesive employed is quite effective, traffic tape strip nevertheless is subject to displacement as vehicles move across. Since traffic tape strip protrudes slightly above the road surface, it is subject to damage by snow plows. Also, the corners tend to wear.

A related practice is the use of reflectors placed within recesses cut in roadway surfaces, which reflectors supplement road markings of paint or traffic strip material.

As another example where the present invention may be employed, in environments where liquids are typically spilled on the floor, such as a restaurant kitchen, it is desirable to provide a sanitary, non-skid surface. The floor typically comprises relatively smooth ceramic tiles. Conventional practice is to employ a set of non-skid mats, which must be cleaned on a regular basis, such as daily. Such is a time-consuming and often difficult task, since the mats must be removed to a cleaning area, typically outdoors. Moreover, materials employed in a restaurant kitchen are subject to various health department regulations.

As is described hereinbelow in detail, the present invention provides methods which address these various applications by employing a specialized diamond surface drill bit to form a shallow recess, for example one-eighth inch deep, and then adhering an insert, such as an adhesively attached pre-molded insert, into the recess. For practice of the methods of the invention in a time-efficient manner, it is desirable to rapidly form recesses which are dry so that adhesives such as epoxy may be immediately employed. Conventional concrete drills typically employ water for lubrication and cooling, rendering them undesirable for use in conjunction with the floor surface and insert systems of the invention.

SUMMARY OF THE INVENTION

Accordingly, it is an object of the invention to provide a rotary surface drill bit for forming a dry recess in a wearing surface, such as concrete, asphalt-concrete, masonry (including block and brick), tile, terrazzo or stone.

It is a related object of the invention to provide a rotary surface drill bit which may be assembled in a variety of ways to suit different conditions which may be encountered at various job sites, while minimizing the number of parts required.

It is another object of the invention to provide a method for applying durable markings to a wearing surface, such as a factory floor or a roadway.

It is yet another object of the invention to provide a method for forming a sanitary, non-skid floor surface.

In accordance with the invention, a rotary surface drill bit for forming a dry recess in a wearing surface includes a base member which has a rear portion having means for attachment to a rotary driver, and a generally planar forward portion having a circular periphery. Centered within the planar forward portion and extending axially therefrom are pilot means for engaging the surface to maintain the lateral position of the drill bit during operation. The pilot means may alternatively comprise a core drill, or a pin for engaging a pre-drilled hole in the masonry surface.

Attached to the planar forward portion of the base member are two types of diamond-impregnated cutting element segments. Specifically, attached to the planar forward portion generally around the periphery thereof are a plurality of diamond-impregnated peripheral gauge cutting element segments of arcuate configuration, which in operation accurately define the diameter of a circular recess formed by the surface drill bit. The peripheral gauge cutting element segments are spaced from each other so as to define a discontinuous circle with circumferential spaces between adjacent peripheral gauge cutting element segments. Also attached to the planar forward portion are a plurality of diamond-impregnated inside cutting element segments of vane-like configuration. The inside cutting element segments are arranged in a generally radially extending pattern such that all areas of the masonry surface within the peripheral extent of the drill bit, at least up to the pilot means, are cut away as the drill bit rotates during operation. The inside cutting elements are configured so as to promote airflow for cooling and debris removal.

In one particular radially extending pattern, at least some of the inside cutting element segments have ends within the circumferential spaces between the peripheral gauge cutting element segments, and others of the inside cutting element segments are angularly spaced from those of the peripheral gauge cutting element segments which have ends within the circumferential spaces, and partially radially overlap.

Advantageously, the inside cutting element segments are identical in size and configuration to the peripheral gauge cutting element segments. That is, the inside cutting element segments of vane-like configuration have an arcuate configuration identical to that of the peripheral gauge cutting element segments.

In some embodiments, air injection is employed for cooling the surface drill bit during operation, and for carrying away debris. In these embodiments, the pilot means comprises a miniature core drill, and the means for attachment includes passageways whereby air may be injected through the core drill to reach the cutting element segments.

A feature of the rotary surface drill bit of the invention is that it may be assembled in various ways to suit a variety of on-site conditions. In accordance with this aspect of the invention, the means for attachment to the rotary driver comprises a threaded axial bore extending all the way through the base member, perpendicular to the generally planar forward portion. A shank element is provided which is threaded at one end for engagement with the threaded axial bore from the rear portion of the base member, and is configured at its other end for attachment to the rotary driver. In use, the shank element is threadably assembled to an intermediate portion within the threaded axial bore such that the other end extends axially outwardly from the rear portion. Various shank elements may be provided, differing in configuration of the other end for attachment to the rotary driver, such as of differing shaft diameters. In addition, shank elements may be provided having axial bores to facilitate air injection.

Further in accordance with the assembly aspect of the invention, the pilot means in use is assembled within the threaded axial bore such that one end of the pilot means abuts the threaded end of the shank element within the threaded axial bore, and the other end of the pilot means extends axially outwardly from the forward portion. The pilot means may comprise a miniature core drill, for example, having a $\frac{3}{8}$ inch OD, such that air may be conveniently injected through the core drill. A retaining pin passing through a radial bore in the base member perpendicular to and intersecting the threaded axial bore and through corresponding radial apertures in the core drill bit maintains the core drill bit in a fixed position relative to the base member.

An alternative pilot means may comprise a pilot pin advantageously of the same configuration as the shank element. In particular, the pilot pin is threaded at one end for engagement with the threaded axial bore from the forward portion of the base member in axially abutting relationship with the threaded end of the shank element, and configured at its other end simply as a smooth, cylindrical pin. A "kit" of dual-purpose shank elements and pilot pins may be provided in various sizes for threaded assembly to suit various applications.

For determining recess depth, an outside ring may be secured to the base member and positioned so as to contact the surface when the recess reaches the desired depth.

A method in accordance with the invention for applying durable markings to a wearing surface comprises the steps of employing a rotary surface drill bit, such as the rotary surface drill bit of the invention, to form a dry recess in the surface, and then adhering an insert of contrasting appearance within the recess.

As one alternative, a pre-molded insert may be provided, and adhesive employed to adhere the insert within the recess. The pre-molded insert may be made of an acrylic polymer, or high-yield concrete with a surface treatment for sealing, or of traffic tape strip material.

As another alternative, particularly applicable where the floor or roadway surface is uneven, the insert may be formed in situ, such as by pouring acrylic resin into the recess, and allowing the acrylic resin to cure.

In accordance with yet another aspect of the invention, a method for providing a sanitary, non-skid floor surface includes the steps of employing a rotary surface drill bit, such as the drill bit of the invention, to form a plurality of dry recesses in the floor surfaces. A plurality of premolded inserts are provided, each having a non-skid surface treatment. The pre-molded inserts are adhesively adhered within the recesses.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
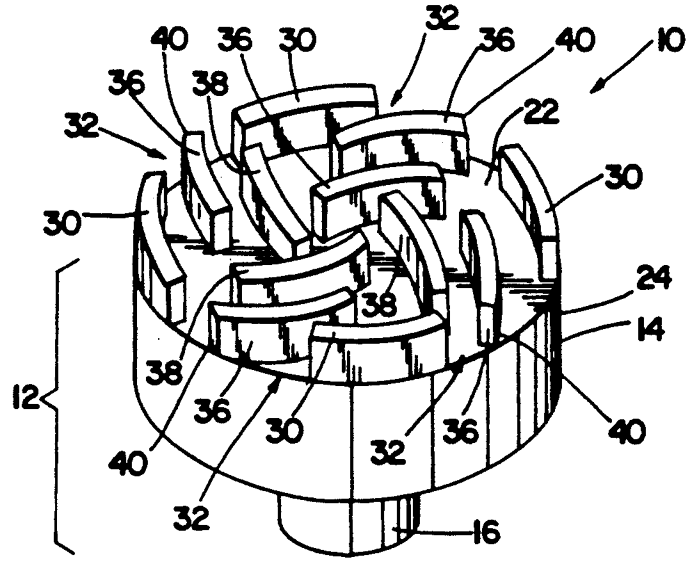
FIG. 1 is a three-dimensional view of a rotary surface drill bit in accordance with the invention, oriented for purposes of illustration with its cutting end facing up, and without any pilot means installed.
Figure 3:
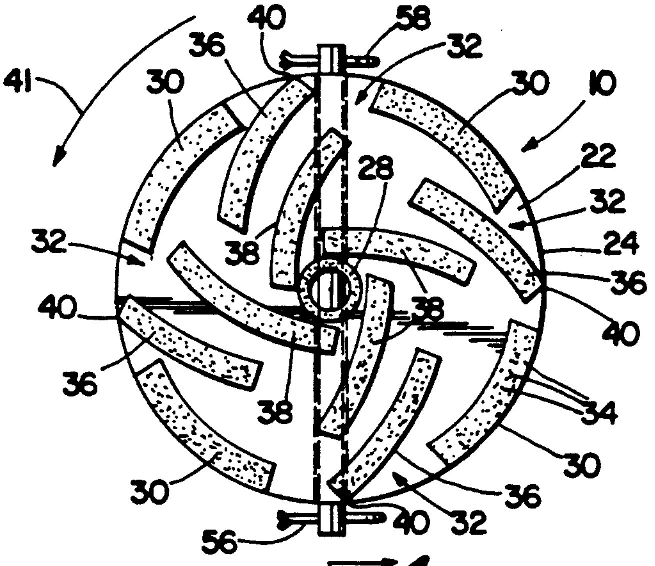
FIG. 3 is an underside or cutting end view of the drill bit, taken generally along line 3—3 of FIG. 1.
Figure 2:
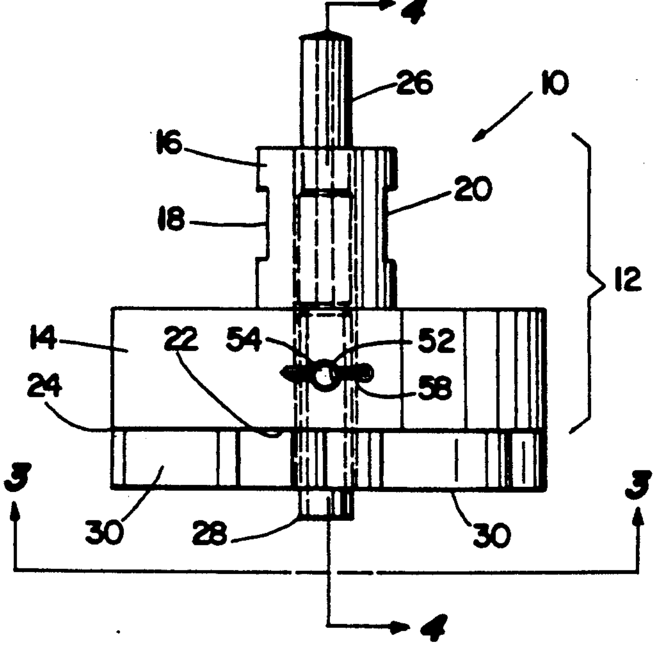
FIG. 2 is a side elevational view of a rotary surface drill bit in accordance with the invention, having a core drill bit installed as the pilot means, with several internal features represented in phantom.

Referring first to FIGS. 1-3, a rotary surface drill bit, generally designated 10, has a base member 12 including a relatively larger diameter forward body portion 14 and an integral, relatively smaller diameter rear body portion 16. To facilitate assembly and disassembly, flats 18 and 20 (FIG. 2) are provided on the rear body portion 16 for wrench engagement. What may be termed the underside of the forward body portion 14 is a generally planar surface forward portion 22 having a circular periphery 24. In conjunction with various forms of cutting element segments as described hereinbelow, this becomes the cutting end of the drill bit 10.

The rear body portion 16 receives a shank element 26 for attachment to a conventional rotary driver (not shown), which, as will be appreciated, drives the drill bit 10 during use. The rotary driver may comprise a unit ranging from an ordinary electric drill to specialized industrial drilling equipment.

Centered within the planar forward portion 22 for engaging the wearing surface within which a recess is to be cut to maintain the lateral position of the drill bit 10 during operation is an axially extending pilot means 28 (FIGS. 2 and 3), illustratively in the form of a miniature core drill bit 28 of, for example, $\frac{3}{8}$ inch diameter.

For establishing the diameter or gauge of the recess formed by the drill bit 10, a plurality of diamond-impregnated peripheral gauge cutting element segments 30 of arcuate configuration are attached to the planar forward portion 22 generally around the periphery 24 thereof. A typical diameter is $2\frac{3}{4}$ inches. It will be appreciated that the peripheral gauge cutting element segments 30 themselves somewhat resemble a conventional core drill, but of insignificant axial extent. The cutting element segments 30 are attached to the planar forward portion 22 by any suitable means, such as by brazing, and are spaced from each other so as to define a continuous circle with circumferential spaces 32 between adjacent peripheral gauge cutting element segments 30. The peripheral gauge cutting element segments 30 are formed of a suitable material, such as sintered powdered metal, with industrial diamonds as cutting elements dispersed throughout the body of each cutting element segments 30 such that, as the cutting element segments 30 are worn during use, additional diamonds are exposed. In FIG. 2, these diamonds are represented by the dots 34.

In order to cut away the entire wearing surface within the recess, a plurality of similar diamond-impregnated inside cutting element segments 36 and 38 also of arcuate configuration are attached to the planar forward portion 22. The inside cutting element segments 36 and 38 are arranged in a generally radially extending pattern such that all areas of the masonry surface within the peripheral extent of the drill bit, at least up to the pilot means 26, are cut away as the drill bit 10 rotates during operation. Moreover, the inside cutting element segments 36 and 38 are vane-like and are arranged so as to promote airflow for cooling.

In one particular arrangement, at least some of the inside cutting element segments, in particular the inside cutting element segments 36, have ends 40 within the circumferential spaces 32 between the peripheral gauge cutting element segments 30, and extend generally radially, but at an angle with respect to a true radial direction, towards the center. The ends 40 of the inside cutting element segments 36 provide additional stabilization of the diameter of the recess formed by the drill bit 10. Others of the inside cutting element segments, in particular the segments 38, are angularly spaced from the cutting element segments 36, in partially radially overlapping relationship. As may be seen in FIG. 3, the inside cutting element segments 36 and 38 are advantageously identical in size and configuration to the peripheral gauge cutting element segments 30, simplifying the manufacture of the drill bit 10 by avoiding the need to order and stock a variety of sizes of cutting element segments.

In use, the diamond surface drill bit 10 is rotated at a relatively high speed, from 2500 to 5000 rpm, in contrast to the 350 to 1500 rpm range of typical water-cooled conventional core drills. Typically a recess is formed in only about twenty seconds, which is an insufficient time for heat to build up beyond the capabilities of airflow cooling. In this regard, it will be appreciated that the vane-like inside cutting element segments 36 and 38, in addition to cutting the surface, promote a high velocity airflow in the manner of a centrifugal blower, and this airflow serves to cool the drill bit during operation, as well as to remove debris. Thus, as indicated in FIG. 3 by an arrow 41, the direction of rotation is counterclockwise when viewed from the cutting end.

Figure 4:
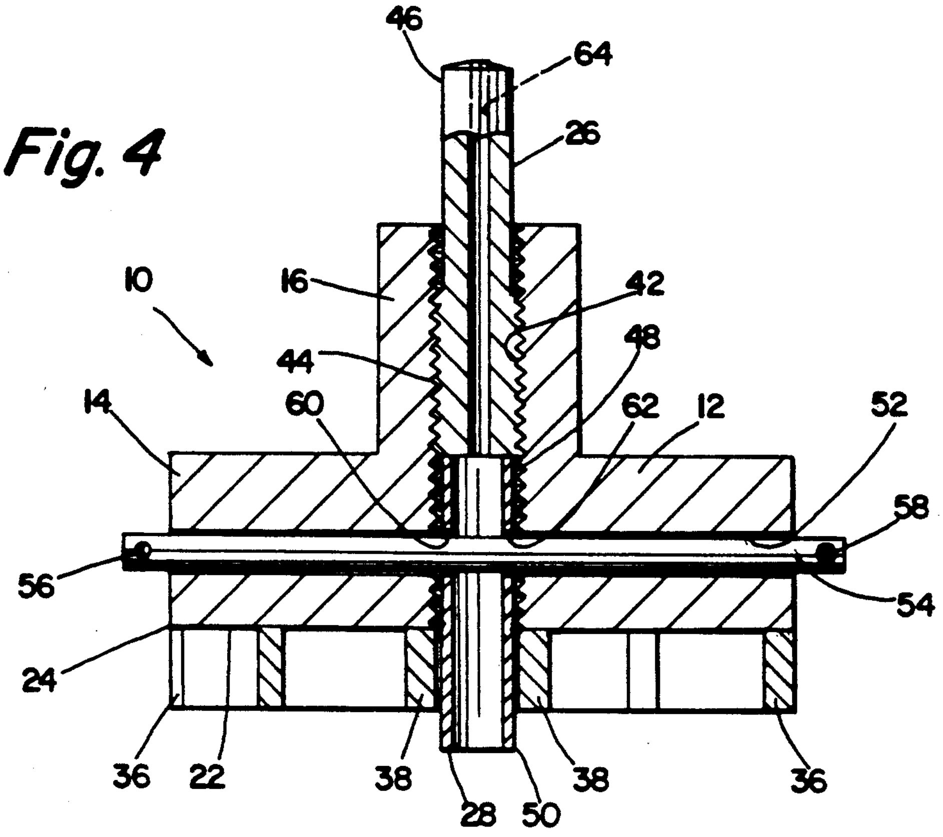
FIG. 4 is an enlarged, mostly cross-sectional view taken along line 4—4 of FIG. 1.

Referring now, in addition to FIGS. 1–3, to FIG. 4, depicted in greater detail are assembly details of the rotary surface drill bit 10. Extending through the base member 12, perpendicular to the generally planar forward portion 22, is a threaded axial bore 42. As detailed in FIG. 3, the shank element 26 is threaded at one end 44 for engagement with the threaded axial bore 42 from the rear portion 16 of the base member 12, and configured at its other end 46 for attachment to the rotary driver (not shown). As shown in FIG. 4, in use the shank element 26 is threadably assembled to an intermediate position within the threaded axial bore 42 such that the other end 46 extends axially outwardly from the rear portion 16. It will be appreciated that the threaded axial bore 42 and the shank element 26 thus together comprise means for attachment to the rotary driver (not shown).

The pilot means, which in FIGS. 2–4 comprises a small core drill bit 28, is assembled within the threaded axial bore 42 such that one end 48 of the core drill bit 28 abuts the threaded end 44 of the shank element 26 within the threaded axial bore 42, and the other end 50 of the core drill bit 28 serving as the pilot means extends axially outwardly from the forward portion 22.

For retaining the core drill bit 28 in position, a radial bore 52 is provided in the forward body portion 1 of the base member 12, at right angles to and intersecting the threaded axial bore 42. A solid retaining pin 54, having suitable keepers 56 and 58 at either end, extends through the radial bore 52 and through a pair of corresponding radial apertures 60 and 62 formed in the sides of the cylindrical core drill bit 28.

This arrangement securely retains the core drill bit 28 in fixed relationship to the base member 12, and provides a positive "stop" against further rotation of the threaded shank element 26 as it is driven. The assembly arrangement has the advantage that the drill bit 10 may be readily disassembled and reassembled in various configurations as are described hereinbelow.

An optional feature depicted in FIG. 4 is the provision of an axial bore 64 in the shank element 26 to permit the injection of cooling airflow to augment the airflow generated by the vane-like inside cutting element segments 36 and 38 as they rotate during operation. It will be appreciated that the bore 64 cooperates with the hollow inside of the core drill bit 28, to provide a continuous passageway for air. The retaining pin 54 is sized with respect to the core drill bit 28 such that space remains for airflow around the retaining pin 54 in its assembled position.

Figure 5:
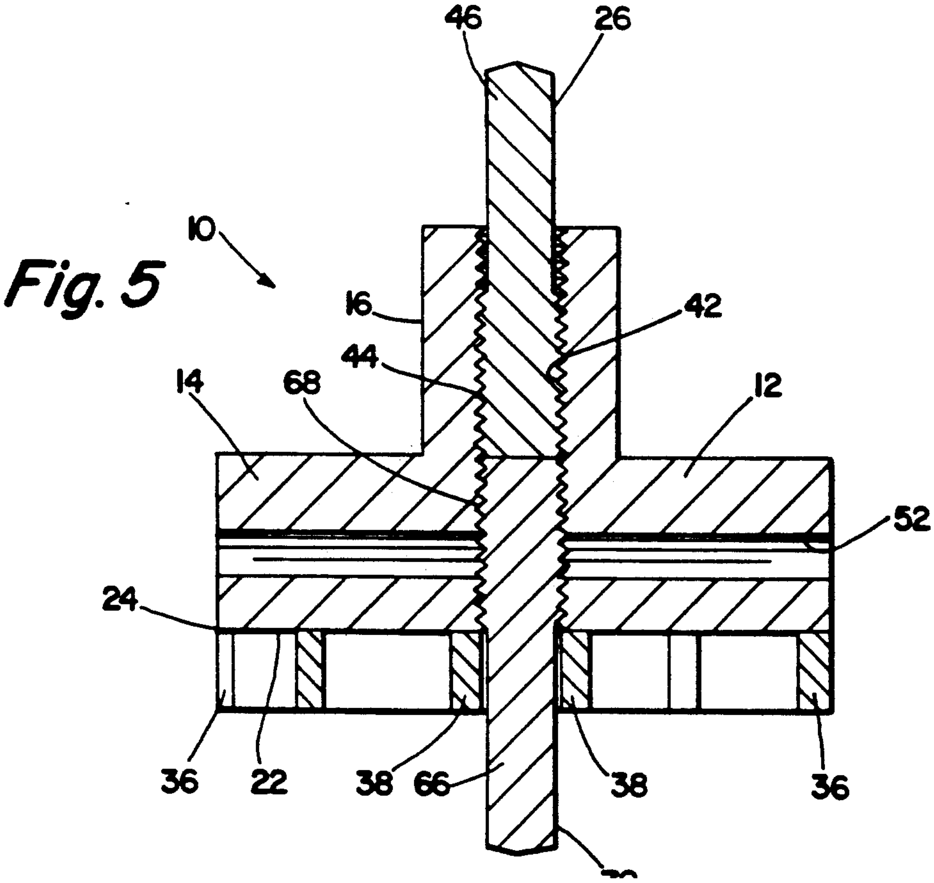
FIG. 5 is a cross-sectional view similar to that of FIG. 4, except depicting a pilot pin as the pilot means, instead of the core drill bit of FIGS. 2-4.

FIG. 5 depicts an alternative manner of assembly of the drill bit 10 wherein, instead of the core drill bit 28, a pilot pin 66 for engaging a pre-drilled hole (not shown) in the wearing surface is employed as the pilot means. The pilot pin 66 embodiment of FIG. 5 is employed in situations where a floor surface is extremely hard, such as glazed ceramic tile where, in order to prevent the drill bit 10 from "wandering", it is necessary to pre-drill a small locating hole.

In overall configuration, the pilot pin 66 is similar to, and may in fact be identical to, the shank element 26. In particular, the pilot pin 66 is threaded at one end 68 for engagement with the threaded axial bore 42 from the forward portion 22 of the base member 2 in abutting relationship with the threaded end 44 of the shank element 26, and has a smooth cylindrical surface end 70 which serves as the actual pilot pin. It will be appreciated that, in the drill bit 10 as assembled in FIG. 5, the retaining pin 54 of FIG. 4 is not employed, and the radial bore 52 accordingly remains empty. While in FIG. 5 no specific means for injecting cooling airflow is provided, it will be appreciated that the shank element 28 and pilot pin element 66 may each be provided with an axial bore (not shown) for this purpose.

An advantage which results from the similar, possibly even identical, construction of the shank element 26 and the pilot pin 66 is that the inventory in a "kit" of parts can be simplified, because two different parts need not be provided. Alternatively, as may be seen in FIG. 5, the shank element 26 and pilot pin 66 have identical threaded portions 44 and 68, but non-threaded portions 46 and 70 of different diameters, such that the particular size for use may be selected to suit particular on-site conditions. For example, the smaller-diameter piece may be used as the shank element 26 for engagement in a ½ inch drill chuck.

Another feature of the invention is the provision of two alternatives for controlling the depth of the recess formed, which is especially important when pre-molded inserts are employed as described hereinbelow. When a pilot pin 66 is employed as in FIG. 5, the length of the pilot pin 66 in cooperation with the depth of the pre-drilled locating hole (not shown) serves to determine the depth of the recess formed, as the pilot pin 66 bottoms out to prevent further advance of the drill bit 10.

Figure 6:
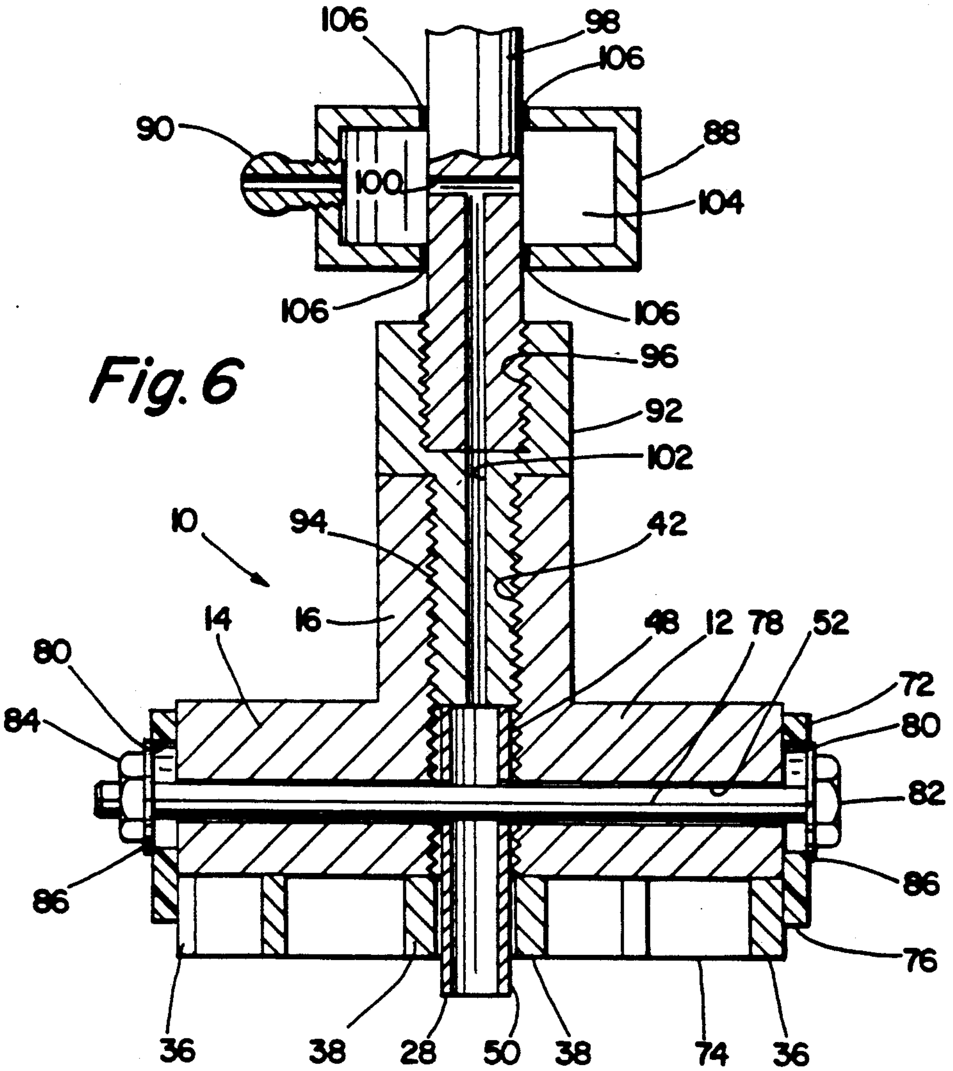
FIG. 6 is a cross-sectional view similar to that of FIG. 4, except depicting an alternative coupling to a rotary driver and including an outside ring for controlling depth.

FIG. 6 depicts another means for controlling the depth of the recess formed. In FIG. 6 the drill bit 10 is fitted with the small core drill bit 28 which serves as the pilot means, as in the case of FIG. 4. The core drill bit 28 will never "bottom out" as in the case of the pilot pin 66 of FIG. 5. To determine the depth of cut, in FIG. 6 an outside ring 72 comprising a short length of tubing of hard plastic or other suitable material of approximately the same diameter as the forward body portion 14 is fitted and clamped to the forward body portion 14 in a position where the distance between the cutting plane 74 and the lower edge 76 of the outside ring 72 determines the depth of cut. Thus, during operation, the lower edge 76 contacts the wearing surface within which the recess is formed just outside the recess diameter when the recess reaches the desired depth. To securely clamp the outside ring 72 in position, a retaining bolt 78 passes through apertures 80 in the outside ring 72 and through the radial bore 52. The bolt head 82 and a nut 84 cooperate with washers 86. It will be appreciated that the retaining bolt 78 serves the same purpose as the FIG. 4 retaining pin 54, and in fact may be substituted for the retaining pin 54.

To permit adjustment of the outside ring 72, the apertures 80 are elongated in the vertical direction. Accordingly, with the nut 84 loosened, the outside ring 72 is moved to a desired position, and the nut 84 then tightened.

Also shown in FIG. 6 is a conventional jacket 88 for injecting air under pressure applied to a fitting 90. Thus, in FIG. 6 the shank element 26 of FIG. 4 is replaced by a coupling adapter 92 externally threaded at 94 for engagement with the threaded axial bore 42, and internally threaded at 96 to receive a drill motor shaft 98. The drill motor shaft 98 has an internal passageway 100 for cooling air, which passageway cooperates with a passageway 102 in the coupling adapter 92 to inject air into the hollow inside of the core drill bit 28. In operation, air under pressure from a compressor (not shown) is applied to the fitting 90 to pressurize the interior 104 of the jacket 88 to force air into the passageway 100 to eventually emerge from the end 50 of the core drill bit 28. The jacket 88 includes suitable bushings 106 to maintain a sufficient seal between the jacket interior 104 and the surrounding atmosphere as the motor shaft 98 rotates.

Figure 7:
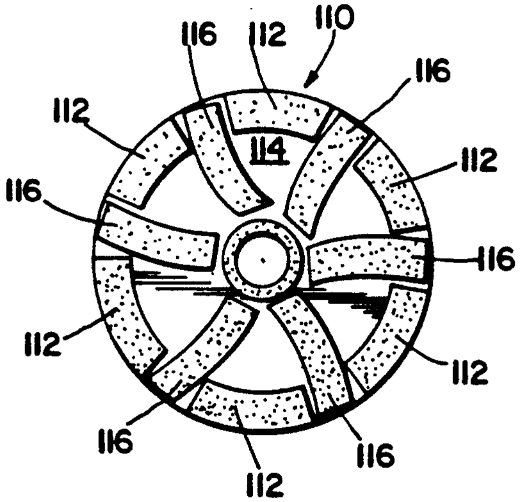
FIG. 7 is an underside or cutting end view, similar to the view of FIG. 3, of an alternative rotary surface drill bit in accordance with the invention.

FIG. 7, which is a view comparable to that of FIG. 3, is an underside or cutting end view of an alternative rotary surface drill bit 110. In all other respects, the drill bit 110 of FIG. 7 is identical to the drill bit 10 of FIGS. 1-6, and accordingly the other views are not repeated.

In FIG. 7, a plurality of peripheral gauge cutting element segments 112 of arcuate configuration are provided, and attached such as by brazing to a generally planar forward portion 114 of the drill bit 110. A single set of vane-like inside cutting element segments 116 arranged in a generally radially extending pattern is provided. The diameter of the FIG. 7 rotary drill bit 110 is approximately 1½ inches.

In the surface drill bit 110 of FIG. 7 as shown, there is minimal space between the peripheral gauge cutting element segments 112 and the vane-like inside cutting element segments 116. While the arrangement depicted does work, the flow of air for cooling and debris removal can be improved by allowing space between the peripheral gauge cutting element segments 112 and the vane-like inside cutting element segments.

Figure 10:
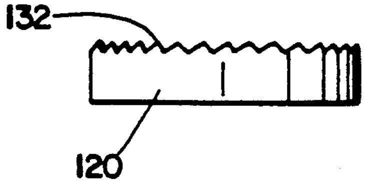
FIG. 10 depicts an insert employed in the practice of the invention.
Figure 8:
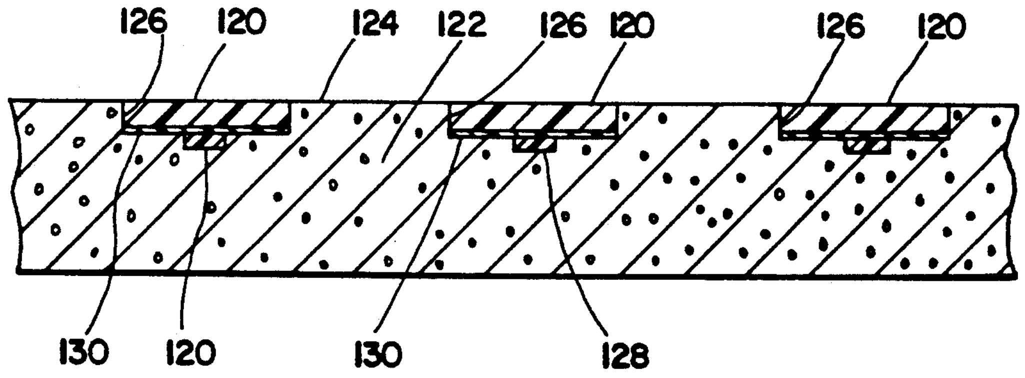
FIG. 8 is a cross-sectional view depicting inserts applied to a masonry or like surface, such as a roadway, a factory floor, or a restaurant kitchen.
Figure 9:
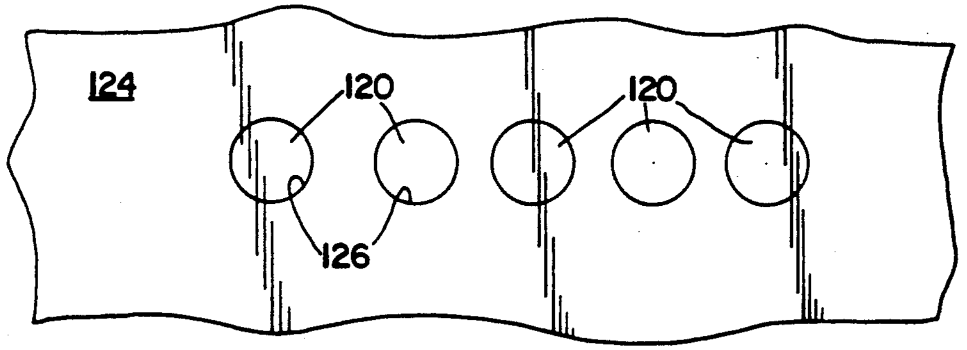
FIG. 9 is a plan view depicting inserts applied in accordance with the methods of the invention

FIGS. 8 and 9 depict a system of floor or roadway inserts 120 installed in accordance with the methods of the invention, while FIG. 10 depicts a single pre-molded insert 120. The inserts 120 are installed in a concrete, tile, terrazzo or other wearing surface body 122 having a surface 124. As discussed hereinabove, the body 122 and its surface 124 are representative of a factory floor environment, a roadway, or a surface, including a ceramic tile surface, wherein it is desired to impart identification markings or a sanitary, non-skid surface.

In accordance with the method of the invention, a rotary surface drill bit, such as the drill bit 10 or 110 described hereinabove, is employed to form a dry recess 126 in the surface 124. Typically, the recess 126 is approximately ⅛ inch deep, with a typical diameter range of from approximately 1½ inches to 3 inches, but subject to wide variation depending upon specific application. Whether a pre-drilled pilot hole is employed, or a core drill bit, such as the core drill bit 28 of FIGS. 2-4 is employed, the recesses 126 each have a small, central hole 128 which is filled upon installation either with adhesive or insert material, with no particular ill effect.

In one form of the invention, particularly applicable to smooth floor surfaces, pre-molded inserts, such as the insert 120 of FIG. 8 are provided, and adhesive, represented in FIG. 6 as adhesive layer 130, is employed to adhere the insert 120 within the recess 126. Depending upon the particular materials employed, an epoxy adhesive is suitable.

As noted hereinabove, it is a feature of the invention that the rotary surface drill bit 10 or 110 employed does not require water lubrication and accordingly forms dry recesses which are immediately receptive to the adhesive 130, or immediately receptive to an insert 120 formed in situ.

Various alternative forms of pre-molded inserts 120 may be employed. For example, in an industrial identification system, the pre-molded inserts 120 may be provided in various colors, and termed "pre-molded identification units". Similarly, in a roadway environment, pre-molded inserts colored white and yellow may be provided.

A particularly advantageous form of pre-molded insert for roadway use is one formed of conventional traffic tape strip material. Traffic tape strip is polymer based, has adhesive on the underside for attachment, and includes embedded glass beads to impart reflecting characteristics. While traffic tape strip is normally applied to a roadway surface as a substitute for paint, advantageously traffic tape strip can be cut into properly-sized pre-molded inserts and installed in the recesses formed in accordance with the invention. This provides advantages in that the traffic tape strip does not protrude above the road surface, and lasts longer. In this regard, it may be noted that traffic tape strip material may be provided in a variety of thicknesses, including stock $\frac{1}{8}$ inch thick, to exactly match the $\frac{1}{8}$ inch deep recesses.

While it is known to place reflectors within recesses formed in roadway surfaces, the present invention differs in that the insert matches the size of the recess. An advantage is that asphalt "creep", which otherwise occurs at the edges of such a recess, is minimized.

In applications where it is desired to provide a sanitary, non-skid floor surface, such as in a restaurant kitchen, the pre-molded inserts 120 have a non-skid surface treatment, represented in FIG. 10 as a surface treatment 132, which imparts the desired non-skid properties, and yet meets health department regulations. As one example, epoxy grout material approved a having non-bacteriological properties and intended for use between tiles can be molded into pre-molded inserts 120 for restaurant kitchen floors. To provide the non-skid surface 132, aluminum oxide powder is sprinkled on the insert surface as it is setting to become partially embedded therein.

It will be appreciated that, depending upon the particular application, the pre-molded insert 120 may comprise any one of a variety of other materials such as an acrylic polymer, or a high-yield concrete pre-treated to seal the surface.

Alternatively, in the case of uneven floor surfaces, the insert 120 may be formed and adhered in situ in a one-step operation. In particular, liquid acrylic resin is employed, mixed with an appropriate catalyst, and immediately poured into the recess, and allowed to cure.

Figure 11:
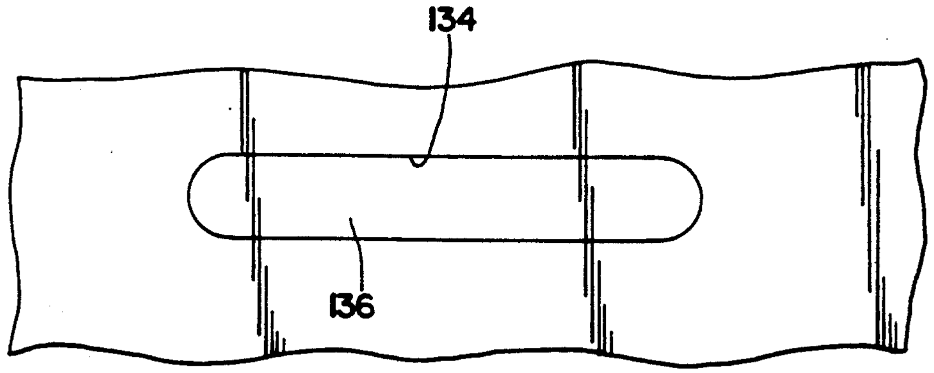
FIG. 11 is a plan view depicting an alternative form of recess and corresponding pre-molded insert of laterally extended configuration in accordance with the invention.

Finally, FIG. 11 depicts an alternative form wherein a longitudinally-extending recess 134 is formed, and a suitably-formed pre-molded insert 136 is provided and adhesively adhered within the recess 134. To form the elongated recess 134, a suitable alignment jig (not shown) is provided, and the rotary surface drill bit is repeatedly moved along the position of the recess 134, with an increasing depth of cut for each pass. This particular embodiment is particularly adapted for placing extended lane markings on roadways, and lengths of traffic tape strip material may be employed as described hereinabove. Another advantage over the conventional placement of traffic tape strip material on a roadway surface is that the otherwise square corners of the tape strip are rounded to fit the shape of the recess 134, which minimizes wear.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A rotary surface drill bit for forming a dry recess in a wearing surface, said drill bit comprising:

a base member including a rear portion having means for attachment to a rotary driver, and a generally planar forward portion having a circular periphery;

axially extending pilot means centered within said planar forward portion for engaging the surface to maintain the lateral position of said drill bit during operation;

a plurality of diamond-impregnated peripheral gauge cutting element segments of arcuate configuration attached to said planar forward portion generally around the periphery thereof and spaced from each other so as to define a discontinuous circle with circumferential spaces between peripheral gauge cutting element segments; and a plurality of diamond-impregnated inside cutting element segments of vane-like configuration attached to said planar forward portion and arranged in a generally radially extending pattern such that all areas of the surface within the peripheral extent of said drill bit at least up to said pilot means are cut away as said drill bit rotates during operation, and said inside cutting element segments promote airflow in a radially outward direction for cooling;

said peripheral gauge cutting element segments and said inside cutting element segments having generally flat cutting surfaces lying in a common plane.

2. A rotary surface drill bit in accordance with claim 1, wherein said pilot means comprises a core drill bit.

3. A rotary surface drill bit in accordance with claim 1, wherein said pilot means comprises a pilot pin for engaging a pre-drilled hole in the masonry surface.

4. A rotary surface drill bit in accordance with claim 1, wherein said base member and said means for attachment include passageways whereby air may be injected to reach said cutting element segments.

5. A rotary surface drill bit in accordance with claim 1, which further comprises an outside ring secured to said base member and positioned so as to contact the surface when the recess reaches the desired depth.

6. A rotary surface drill bit for forming a dry recess in a wearing surface, said drill bit comprising:

a base member including a rear portion having means for attachment to a rotary driver, and a generally planar forward portion having a circular periphery;

axially extending pilot means centered within said planar forward portion for engaging the surface to maintain the lateral position of said drill bit during operation;

a plurality of diamond-impregnated peripheral gauge cutting element segments of arcuate configuration attached to said planar forward portion generally around the periphery thereof and spaced from each other so as to define a discontinuous circle with circumferential spaces between peripheral gauge cutting element segments; and a plurality of diamond-impregnated inside cutting element segments of vane-like configuration attached to said planar forward portion and arranged in a generally radially extending pattern such that all areas of the surface within the peripheral extent of said drill bit at least up to said pilot means are cut away as said drill bit rotates during operation, and said inside cutting element segments promote airflow for cooling, at least some of said inside cutting element segments having ends within the circumferential spaces between said peripheral gauge cutting element segments.

7. A rotary surface drill bit in accordance with claim 6, wherein others of said inside cutting element segments are angularly spaced from and partially radially overlap said at least some of said inside cutting element segments.

8. A rotary surface drill bit for forming a dry recess in a wearing surface, said drill bit comprising:

a base member including a rear portion having means for attachment to a rotary driver, and a generally planar forward portion having a circular periphery;

axially extending pilot means centered within said planar forward portion for engaging the surface to maintain the lateral position of said drill bit during operation;

a plurality of diamond-impregnated peripheral gauge cutting element segments of arcuate configuration attached to said planar forward portion generally around the periphery thereof and spaced from each other so as to define a discontinuous circle with circumferential spaces between peripheral gauge cutting element segments; and a plurality of diamond-impregnated inside cutting element segments of vane-like configuration identical in size and configuration to said peripheral gauge cutting element segments attached to said planar forward portion and arranged in a generally radially extending pattern such that all areas of the surface within the peripheral extent of said drill bit at least up to said pilot means are cut away as said drill bit rotates during operation, and said inside cutting element segments promote airflow for cooling.

9. A rotary surface drill bit for forming a dry recess in a wearing surface, said drill bit comprising:

a base member including a rear portion having means for attachment to a rotary driver, and a generally planar forward portion having a circular periphery;

axially extending pilot means centered within said planar forward portion for engaging the surface to maintain the lateral position of said drill bit during operation;

a plurality of diamond-impregnated peripheral gauge cutting element segments of arcuate configuration attached to said planar forward portion generally around the periphery thereof and spaced from each other so as to define a discontinuous circle with circumferential spaces between peripheral gauge cutting element segments;

a plurality of diamond-impregnated inside cutting element segments of vane-like configuration attached to said planar forward portion and arranged in a generally radially extending pattern such that all areas of the surface within the peripheral extent of said drill bit at least up to said pilot means are cut away as said drill bit rotates during operation, and said inside cutting element segments promote airflow for cooling;

said means for attachment to a rotary driver comprising:

a threaded axial bore extending through said base member perpendicular to said generally planar forward portion, and a shank element threaded at one end for engagement with said threaded axial bore from said rear portion of said base member, and configured at its other end for attachment to the rotary driver, said shank element in use being threadably assembled to an intermediate position within said threaded axial bore such that said other end extends axially outwardly from said rear portion; and said pilot means in use being assembled within said threaded axial bore such that one end of said pilot means abuts the threaded end of said shank element within said threaded axial bore and the other end of said pilot means extends axially outwardly from said forward portion.

* * * * *